Aug. 5, 1952 W. F. SPANG 2,605,496
POULTRY DRESSING MACHINE
Filed Dec. 14, 1946 3 Sheets-Sheet 1
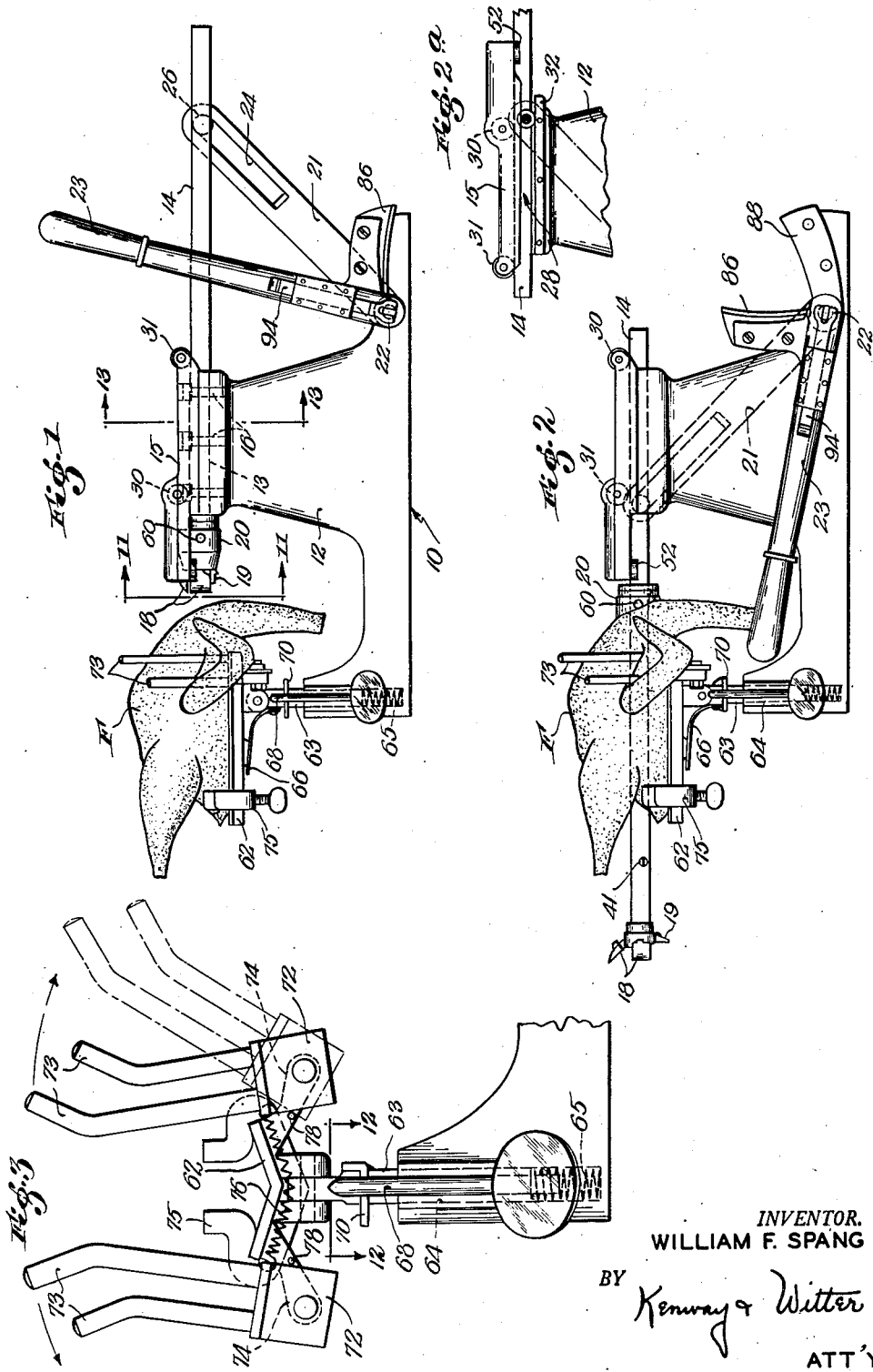
INVENTOR.
WILLIAM F. SPANG
BY Kenway & Witter
ATT'YS.

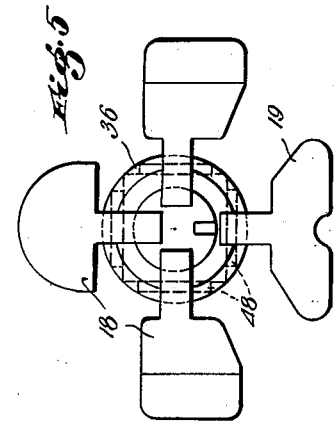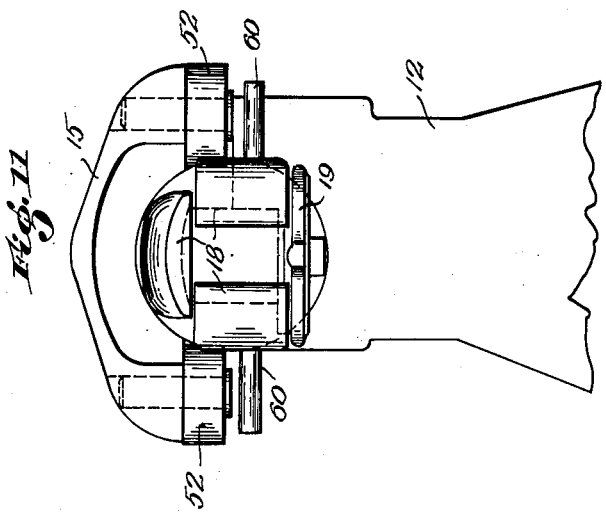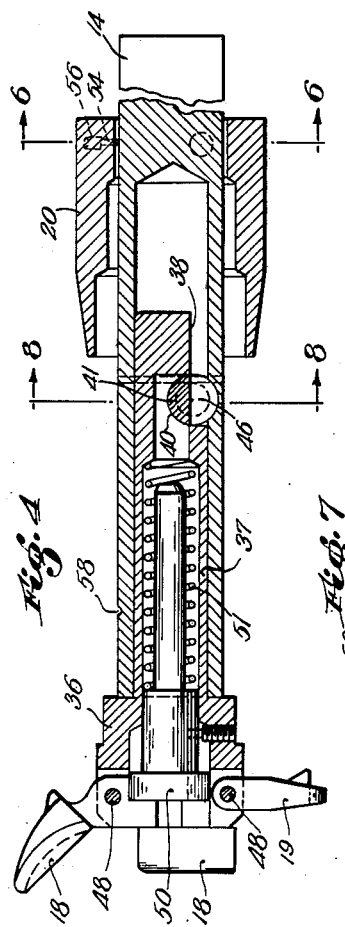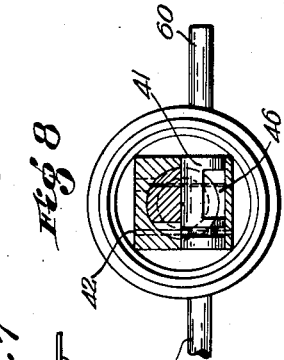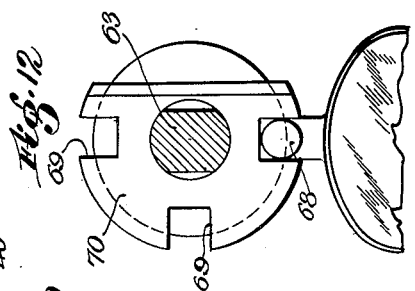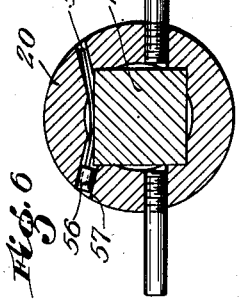

Aug. 5, 1952 W. F. SPANG 2,605,496
POULTRY DRESSING MACHINE
Filed Dec. 14, 1946 3 Sheets-Sheet 3
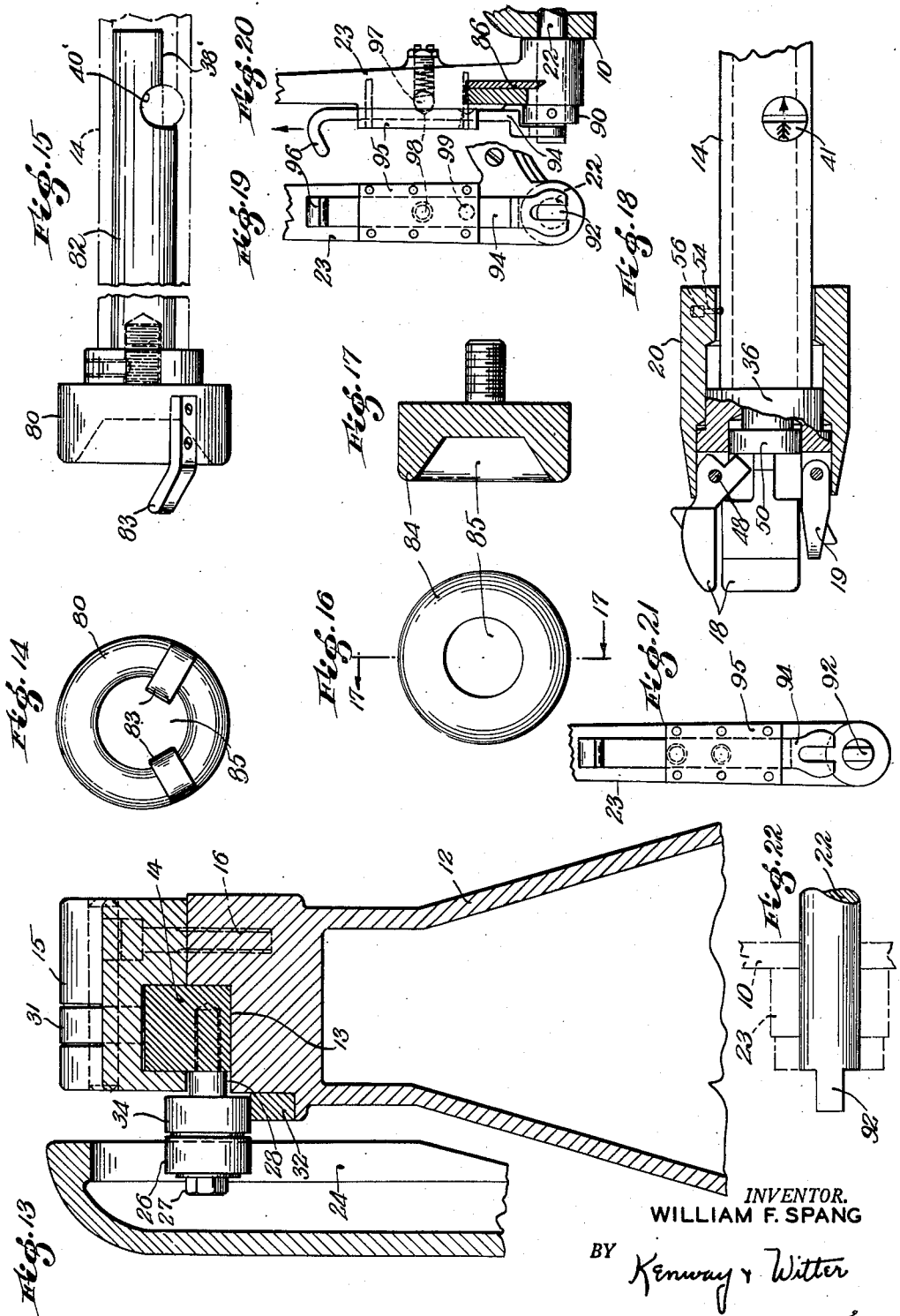
INVENTOR.
WILLIAM F. SPANG
BY Kenway & Witter
ATT'YS.

Patented Aug. 5, 1952

2,605,496

UNITED STATES PATENT OFFICE 2,605,496

POULTRY DRESSING MACHINE

William F. Spang, Milton, Mass., assignor to Cube Steak Machine Co., Boston, Mass., a partnership Application December 14, 1946, Serial No. 716,380

11 Claims. (Cl. 17—11)

1

This invention relates to machines and apparatus for cleaning or eviscerating poultry, game and other food animals, and the primary object of the invention is to provide an improved machine of the nature shown in Spang Patent 2,327,224.

The invention contemplates a support for a bird or the like to be cleaned and cooperating means including a longitudinally movable ram having an eviscerating head on its forward end adapted to engage and force the entrails from the bird when driven therethrough. The ram is operated longitudinally by a lever pivoted to the base of the machine and one object of the invention resides in improved construction supporting the ram on the base and cooperating with the lever and ram to support them against the down thrusts exerted by the lever at the forward and rearward portions of its travel, all as hereinafter more specifically described.

The eviscerating head carries cleaning fingers which are in collapsed position when they enter the bird and are sprung to open and cleaning position after entering. The improved ram supporting construction includes a removable block cooperating with the ram on the base and carrying a pair of rolls on its forward end adapted to engage and automatically collapse the fingers when the ram is retracted. A collar on the ram cooperates with the fingers to hold them collapsed and a further object of the invention resides in the provision of resilient detent means for holding the collar in finger collapsed position during passage of the fingers into the bird together with a plurality of outwardly projecting stop pins on the collar for releasing the collar and permitting opening of the fingers only when the fingers are in proper cleaning position within the bird and are driven forwardly for effecting the cleaning operation.

The forward end of the longitudinally movable ram is of tubular construction and a further feature of the invention resides in the provision of a removable eviscerating head carried on the forward end of a shank slidably mounted in the forward tubular end of the ram and a rotary locking plug cooperating with the shank, thereby providing for readily interchanging the heads for operating on birds varying in size and otherwise.

A further feature of the invention relates to improved means for supporting the fowl during the eviscerating operation. This means comprises a supporting saddle having two fowl holding elements pivoted to its opposite sides. These elements are pivotally movable in two directions to accommodate the size of fowl being cleaned and a further object of the invention resides in the provision of novel stop means for limiting the movement of these elements in both directions.

Another feature of the invention relates to the operating handle for the eviscerating head together with a shearing blade carried by the handle and means for disengaging the handle from the head and thereby providing an independently operable shearing device for removing the heads and feet of the fowls being cleaned.

These and other features of the invention will be best understood and appreciated from the following description of a preferred embodiment thereof selected for purposes of illustration and shown in the accompanying drawings wherein, Fig. 1 is a side elevation of a poultry dressing machine embodying my invention, Fig. 2 is a like view with the parts in another position, Fig. 2ª is a fragmentary view of the opposite side of the machine, Fig. 3 is an enlarged fragmentary elevation of the fowl supporting saddle, Fig. 4 is an enlarged fragmentary sectional view through the eviscerating ram, Fig. 5 is a front end elevation thereof, Fig. 6 is a sectional view taken on line 6—6 of Fig. 4, Fig. 7 is a side elevation of a resilient wire detent, Fig. 8 is a sectional view taken on line 8—8 of Fig. 4, Fig. 9 is an enlarged side elevation of a locking plug, Fig. 10 is a front end elevation thereof, Fig. 11 is an enlarged fragmentary elevation taken on line 11—11 of Fig. 1, Fig. 12 is an enlarged fragmentary view taken on line 12—12 of Fig. 3, Fig. 13 is an enlarged fragmentary sectional view taken on line 13—13 of Fig. 1, Fig. 14 is a front end elevation of a modified eviscerating head, Fig. 15 is a side elevation of the head and its supporting shank, Fig. 16 is a front elevation of a further modified eviscerating head, Fig. 17 is a longitudinal sectional view taken on line 17—17 of Fig. 16, Fig. 18 is an enlarged fragmentary sectional view of the eviscerating head of Figs. 1 and 4 with the fingers held in collapsed position, Fig. 19 is an enlarged fragmentary front elevation of the operating handle, Fig. 20 is a side elevation thereof, Fig. 21 is a view like Fig. 19 but illustrating the handle disengaged from its shaft, and Fig. 22 is an enlarged fragmentary side elevation of the handle shaft.

In the drawings 10 indicates a base including an upwardly extending pillar 12. Mounted horizontally and slidable longitudinally on a flat 13 on top of the pillar is a square ram 14. A block 15 secured to the pillar by tap bolts 16 encloses and forms a guideway for the ram as illustrated in Fig. 13. A plurality of cleaning fingers 18 and 19 are carried on the forward end of the ram and a collar 20 is slidably mounted on the ram rearwardly of the fingers.

The ram 14 is moved longitudinally in its guideway by means of an arm 21 fixed to a shaft 22 which also carries an operating handle 23 on the base 10. The top portion of the arm 21 is slotted to provide a guideway 24 cooperating with a roller 26 on a stud 27 carried by the ram 14, the stud extending outwardly through a recess 28. It will be apparent that oscillating movement of the shaft 22 will serve to slide the ram 14 forwardly and rearwardly and furthermore that the arm exerts considerable downward and upward thrust on the ram at the forward and rearward portions of its travel. My improved construction is designed to eliminate the deleterious effects of these thrusts.

Rollers 30 and 31 mounted in the rearward and forward portions of the block 15 are arranged to engage the top horizontal surface of the ram 14 and hold it in contact with the flat 13, thereby resisting vertical movement of the ram out of its horizontal path. At the forward portion of its working stroke the arm 21 exerts a substantial downward thrust on the ram 14 and my improved construction eliminates this thrust by providing a track 32 on the pillar for cooperating with a roller 34 carried on the stud 27 directly adjacent to the roller 26. When the arm 21 approaches the pillar the roller 34 engages the track 32 which thereupon supports the downward thrust of the arm on the stud.

The forward end of the ram 14 is of open tubular construction and the fingers 18 and 19 are pivoted on a head 36 supported on a shank 37 slidably supported within this end of the ram. The rear end portion of the shank is cut away to provide a flat 38 and a semi-cylindrical recess 40 is formed in the shank beneath the flat. A locking plug 41 is rotatably mounted transversely in the ram in position opposite to the innermost location of the recess 40 and is secured by a pin insert 42 engaging within an annular groove 44 in the plug. The outer end of the plug is slotted at 45 to receive a screwdriver and the plug is cut away at 46 to permit passage of the shank to the position illustrated in Fig. 4. When the plug is rotated to the position of Fig. 4 it secures the shank within the ram.

The fingers are pivoted on pins 48 and cooperating with the rear portions of the three top fingers 18 is a plunger 50 slidable within the shank 37 and normally pressed forwardly by a compression spring 51. The spring and plunger normally move the fingers 18 to the open position illustrated in Figs. 4 and 5, the bottom finger 19 being free to swing independently. When the ram 14 is retracted to its extreme rearward position (Fig. 1) the two oppositely disposed fingers 18 engage a pair of rollers 52 on the forward end of the block 15 and collapse the fingers to the position illustrated in Figs. 1, 11 and 18. The collar 20, freely slidable on the ram, has an open forward end adapted to receive the collapsed fingers. The function of the collar is to hold the fingers collapsed until they have entered the fowl and are being forced forwardly therein to remove the entrails and the following mechanism is provided to insure this proper functioning of the parts.

I provide a simple resilient detent in the form of a steel wire 54 or the like for performing this function. A head 56 is secured to one end of the wire which is inserted into a bore 57 in the collar, the head serving to hold the wire in place. The intermediate portion of the wire rides resiliently on the top horizontal surface of the ram 14 and is adapted to engage in a recess 58 in the ram when the collar is in its extreme forward position on the ram (Figs. 1 and 18) and hold it in that position during forward movement of the ram wherein the collapsed fingers enter the fowl. Carried by and extending outwardly from the collar are two pins 60 for engaging the fowl after the collapsed fingers have passed thereinto. These pins prevent further forward movement of the collar and the fingers are thereupon released and spring outwardly as the shaft continues its forward movement. The open fingers thus function to engage and force the entrails from the bird.

As illustrated in Fig. 1, a trough-like saddle 62 is provided on the base 10 for supporting the fowl F forwardly of the eviscerating ram 14. The saddle is pivoted to the top end of a post 63 supported vertically in a socket 64 on a compression spring 65. A leaf spring 66 normally holds the saddle pivoted clockwise against a stop to the position of Fig. 1. The saddle is rotatable with the post to three positions in any one of which it can be held by a pivoted latch bolt 68 engaging in notches 69 of a plate 70 fixed to the post.

Two wing supporting elements 72 with two posts 73 extending upwardly from each are pivoted respectively to two ears 74 projecting outwardly from opposite sides of the saddle, and a clamp 75 is provided for supporting the fowl at the rear end of the saddle. The elements 72 are normally drawn inwardly to the position of Fig. 3 by a spring 76 and two stop lugs or pins 78 are provided for limiting pivotal movement of the elements in both directions. The elements are pivoted to a position accommodating the size of fowl being cleaned and the stops prevent movement of the elements beyond the limits employed.

The machine is adapted to clean fowls varying substantially in size and when birds of particularly small size are to be cleaned it is desirable to employ an eviscerator head of modified and somewhat smaller construction. In Figs. 14-17 I have illustrated two such modified heads. The head 80 is screw-threaded to and supported on the forward end of a shank 82 having its rear end portion shaped in like manner as the shank 37. The head can employ a plurality of fixed fingers 83 or, for use with very small birds, the fingers may be eliminated as illustrated by the head 84 in Figs. 16 and 17. It will be apparent that by rotating the locking plug 41 180° the head 36 with its shank 37 may be removed from the ram 14 and either head 80 or 84 substituted therefor and employed in the machine.

It should be understood that the heads 80 and 84 are employed for cleaning birds too small to be cleaned with the head 36, and the head 80 with its fingers 83 is preferably employed for this purpose. When the head 80 is driven into the bird the socket 85 receives the gizzard and the fingers 83 are disposed to engage the cords extending from the lungs and gizzard and aid in holding the entrails centered on the head. In this manner the forwardly moving head serves cleanly to remove all the organs including the lungs. Except for the fingers the head may occasionally pass through birds, larger than those of minimum size, without fully removing the entrails.

In using the machine, the head and feet of the fowls are first removed by a shearing blade 86 on the handle 23 cooperating with a fixed blade 88 on the base 10 and a further feature of the invention resides in the provision of means for clutching and de-clutching the handle to and from the shaft 22 for the purpose of providing an independently operable shearing device merely by de-clutching the handle. As illustrated in Figs. 19-22, the handle 23 is mounted loosely on the shaft 22 between the base 10 and a collar 90 pinned to the shaft. The portion 92 of the shaft projecting outwardly beyond the collar is flatted to receive the jaws of a clutching element 94 slidably mounted on the handle beneath a supporting bracket 95. The top end 96 of the element 94 is bent outwardly to provide an operating finger hold and a spring pressed ball 97 in the handle is adapted to cooperate with two depressions 98 and 99 in the element for holding it in its two positions. It will be apparent that the element 94 can be readily shifted to either of its two positions and thus conveniently employ the handle 23 for either of its two functions.

The fowl to be cleaned, with the head and feet removed, is placed on the saddle 62 in the position illustrated. The saddle is first swung to a position in which the bird faces the operator and the crop is removed and a suitable aperture made in the bird for entry of the eviscerator head. The saddle is then swung 180° and the rear end of the bird is opened to permit removal of the entrails by the eviscerator head and its fingers. The saddle is then placed in the position of Fig. 1.

The handle 23, with the clutch 94 engaged, is turned backwardly to the position of Fig. 1 wherein the rolls 52 engage and collapse the fingers 18 and set the collar 20 to the latched position shown in Fig. 18. The handle is then swung forwardly to drive the eviscerator head into and through the bird. The head enters the bird with the fingers collapsed but the pins 60 thereupon engage the breast of the bird and prevent further forward travel of the collar 20. The fingers are thereupon released and spring outwardly into position to engage and force the entrails from the body. The track 32 and rolls 30 and 31 provide bearing supports for resisting the downward and upward thrusts of the arm 21 on the ram 14 at the forward and rearward portions of the arm travel, thereby maintaining the ram in its true horizontal path on the bearing surface 13 of the pillar. It will furthermore be apparent that the detent 54 together with the pins 60 serve to maintain the fingers in collapsed position until they have fully entered the bird and are in proper location for opening and performing their intended function.

Having thus disclosed my invention what I claim as new and desire to secure by Letters Patent of the United States is:

1. A poultry cleaning machine comprising a base, a poultry support on the base, a ram cooperating with and mounted for longitudinal movement on the base toward and from the support, a plurality of fingers pivoted to the forward end of the ram for engagement with a fowl on the support, resilient means in the ram operative on the fingers normally to move and hold them pivoted outwardly to open position, a collar mounted to slide forwardly on the ram to a position engaging and holding the fingers collapsed forwardly and inwardly, and resilient detent means providing a releasable connection between and holding the collar in its forward and finger collapsed position on the ram, rearward pressure on the collar being adapted to release said connection.

2. The machine defined in claim 1 in which said resilient detent means comprises a resilient wire carried transversely in the collar with its intermediate portion engaging the ram and in which a shallow recess is provided in the ram in position to receive said portion of the wire when the collar is in said forward position.

3. The machine defined in claim 1 plus a plurality of pins carried by and extending outwardly from the collar for engaging the fowl and releasing said connection when the forward end of the ram is forced forwardly into a fowl.

4. A fowl cleaning machine comprising a base, a pillar on the base, a ram disposed horizontally and for sliding movement longitudinally on the pillar, a plurality of fingers pivoted to the forward end of the ram for engaging and cleaning a fowl, resilient means in the ram operative on the fingers normally to move and hold them pivoted outwardly to open position, a pair of rolls carried by the pillar at opposite sides of the ram in position to engage two oppositely disposed fingers and collapse the fingers forwardly and inwardly when the ram is moved rearwardly, and a collar slidably mounted on the ram rearwardly of and adapted to engage and hold the fingers in collapsed position.

5. The machine defined in claim 4 in which the ram is slidably mounted in a guideway in the top of the pillar, and a block removably mounted on the pillar above and cooperating with the guideway to support the ram, said block having a forward portion projecting beyond the pillar and supporting said pair of rolls.

6. The machine defined in claim 4 in which the ram is slidably mounted in a guideway in the top of the pillar, a block removably mounted on the pillar above and cooperating with the guideway to support the ram, said pair of rolls being mounted on the forward end of the block, a roll at the rear end of the block and a second roll intermediately of the block both disposed above and cooperating with the ram for guiding and holding it against upward displacement in the guideway, and an arm pivoted to the base beneath and cooperating with the ram for moving the shaft longitudinally.

7. A fowl cleaning machine comprising a base, a pillar on the base, a ram disposed horizontally and for sliding movement longitudinally on the pillar, an arm pivoted to the base beneath and cooperating with the ram rearwardly of the pillar for moving the ram longitudinally, the upper portion of the arm having a guideway extending longitudinally of the arm, a stud carried by the ram and cooperating with the guideway to move the ram longitudinally upon pivotal movement of the arm, the pillar having a horizontal slot therein and disposed laterally thereof permitting movement of the stud therethrough upon longitudinal movement of the ram, and a track on the pillar outside of said slot and laterally of and parallel with the ram and having a top horizontal surface disposed to be engaged by the stud between the arm and pillar and support the down thrust of the stud and arm during the forward portion of the arm movement.

8. A poultry cleaning machine comprising a base, a ram mounted for longitudinal movement on the base, the forward end of the ram being of open tubular construction, an eviscerator head carried on the forward end of a shank slidably mounted in the forward tubular end of the ram, the rear portion of the shank being provided with a flat therealong and the shank being provided with a recess beneath and open to the flat, and a plug rotatably mounted transversely in the ram and partially cut away to cooperate with the flat and permit insertion of the shank to a position disposing said recess opposite to the plug, rotation of the plug being adapted to move the plug into the recess and lock the shank in the ram.

9. The machine defined in claim 7 in which the stud includes an anti-friction roller bearing rotatable about the longitudinal axis of the stud for engaging said top horizontal surface of the track.

10. In an eviscerating machine having an eviscerating ram mounted for longitudinal movement in the machine, an eviscerating head comprising a solid block having a centrally disposed and open socket in its forward end for receiving the gizzard of a bird and supporting the entrails on the head during forward eviscerating movement of the head through the bird, said block having side and bottom walls integral therewith and said socket being open forwardly of said walls, and a shank carried by and projecting rearwardly from the block for mounting the head on the forward end of the ram.

11. The eviscerating head defined in claim 10 plus a plurality of fingers immovably fixed to and disposed in spaced relation about the head and extending forwardly beyond and inwardly over the socket in position to engage cords carried by the entrails.

WILLIAM F. SPANG.

REFERENCES CITED

The following references are of record in the file of this patent:

UNITED STATES PATENTS

| Number | Name | Date |
|---|---|---|
| 1,783,699 | Butcher | Dec. 2, 1930 |
| 1,796,739 | Williams | Mar. 17, 1931 |
| 1,984,562 | Ashby | Dec. 18, 1934 |
| 2,189,484 | Brodeur | Feb. 6, 1940 |
| 2,189,752 | Breitschwerdt | Feb. 13, 1940 |
| 2,254,188 | Poppenga | Aug. 26, 1941 |
| 2,327,224 | Spang | Aug. 17, 1943 |
| 2,423,560 | Jasper | July 8, 1947 |